US006778063B1

(12) United States Patent
Chen

(10) Patent No.: US 6,778,063 B1
(45) Date of Patent: Aug. 17, 2004

(54) ANGULAR POSITION SENSOR

(76) Inventor: Jack Chen, 14 Kimberly Cir., Oak Brook, IL (US) 60521

( * ) Notice: Subject to any disclaimer, the term of this patent is extended or adjusted under 35 U.S.C. 154(b) by 0 days.

(21) Appl. No.: 10/441,389

(22) Filed: May 19, 2003

(51) Int. Cl.$^7$ ............................................... H01C 10/32
(52) U.S. Cl. ....................... 338/162; 338/199; 338/197; 338/175; 338/116
(58) Field of Search ................................ 338/162, 175, 338/197, 199, 116, 190

(56) References Cited

U.S. PATENT DOCUMENTS

| | | | |
|---|---|---|---|
| 3,696,318 A | * 10/1972 | Mack | 338/162 |
| 3,970,986 A | * 7/1976 | Seyler et al. | 338/171 |
| 6,483,422 B2 | * 11/2002 | Hosogoe | 338/162 |
| 6,501,367 B2 | * 12/2002 | Fleig et al. | 338/162 |

* cited by examiner

Primary Examiner—Karl D. Easthom
(74) Attorney, Agent, or Firm—Robert L. Marsh

(57) ABSTRACT

An angular position sensor determines the angular orientation of a rotatable shaft. The device includes a rotor rotatable with the shaft. A first housing receives the rotor and a second housing at least partially surrounds the first housing. A flexible member between the first housing and the second housing permits vibration of the first housing while the second housing remains stationary.

5 Claims, 6 Drawing Sheets

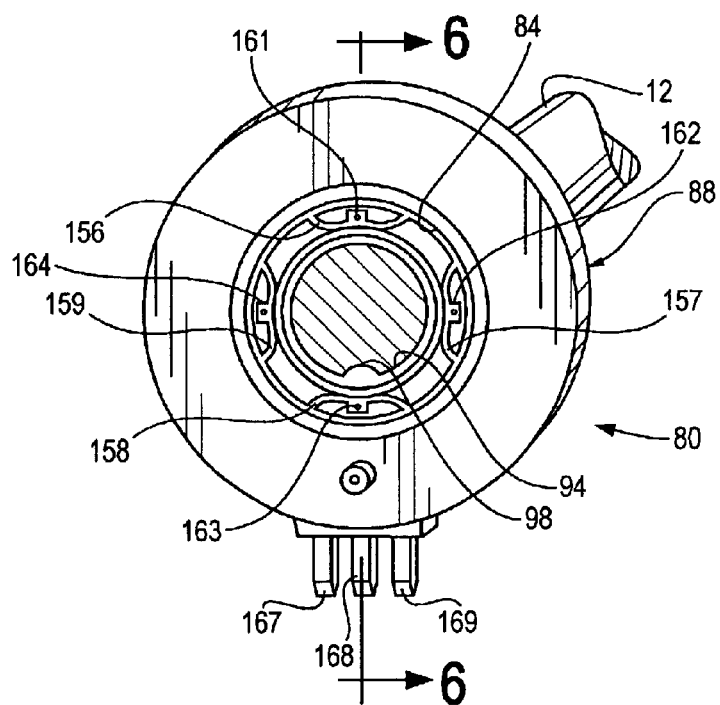
FIG. 5
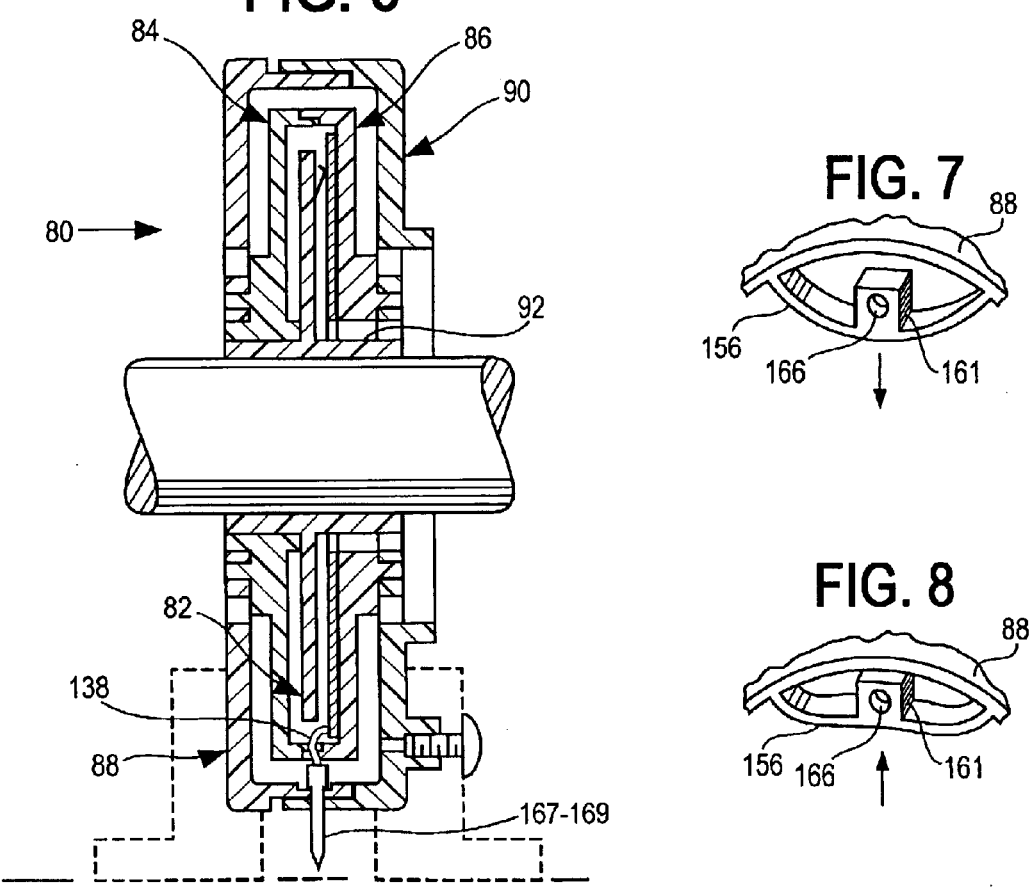
FIG. 6
FIG. 7
FIG. 8

ANGULAR POSITION SENSOR

The present invention relates to an improved angular position sensor, which will not suffer damage as result of differential vibration between a rotating shaft and a housing.

BACKGROUND OF THE INVENTION

An angular position sensor detects the angular orientation of a rotating shaft with respect to a housing. It may be desirable, for example, to know exactly when a rotating shaft is in a given angular orientation and therefore it is desirable to monitor the angular orientation of a shaft as it rotates about its longitudinal axis.

In the immediate proximity of a bearing, a rotating shaft will exhibit little radial vibration. Along a length of shaft between spaced bearings, however, a rotating shaft will endure a certain amount of radial vibration, or differential vibration, because the shaft is not perfectly symmetric about its longitudinal axis and the bearings positioned along the length of a shaft are not perfectly aligned with the axis of the shaft.

Existing angular positioned sensors consist of a rotor which fits around the circumference of the shaft and includes a brush which engages an annular resistive contact mounted on a stationary member. An electrical potential is applied across the resistive member and the brush and the current through the resistive member is measured to provide a reading of the angular orientation of the brush with respect to the resistive member.

To accommodate for differential vibration, the stationary member is configured as a clamshell loosely assembled around the rotor with the stationary clamshell mounted to the housing through which the shaft passes. As a result of the forgoing, the rotor can vibrate with the shaft and within the stationary clamshell. Currently, the parts of the angular position sensor, including the rotor and the clamshell, are made of plastic and the differential vibration of the plastic rotor within the clamshell results in contact between the rotor and clamshell housing. The friction that occurs as portions of the spinning rotor contact the clam shell causes fine particles of plastic to be tossed within the interior of the clam shell and the particles of plastic ultimately create interference between the brushes and the resistive surfaces on the stationary member. The interference between the contacts of the brushes and the annular resistive substrate causes the device to produce inaccurate angular position readings. It would be desirable, therefore, to provide an improved angular position sensor having parts that would not vibrate against each other while the rotor is rotating with a shaft.

SUMMARY OF THE INVENTION

Briefly, the present invention is embodied in an angular position sensing device for determining the angular orientation of a shaft rotatable with respect to a housing body. The sensor includes a rotor having a bore sized to receive the shaft and means for locking the rotor for rotation with the shaft. The rotor also has an annular male bearing surface.

The device further includes a first rotor housing having an annular female bearing surface complementary to the annular male bearing surface of the rotor. The female bearing surface of the first rotor housing is in engagement with the male bearing surface of the rotor thereby allowing the rotor to freely rotate within the first rotor housing while the first rotor housing vibrates with the rotor and the shaft.

Like prior art angular position sensors, a sensor in accordance with the present invention has an annular resistive substrate on one of the rotor and the rotor housing and a brush on the other of the rotor and the rotor housing. The brush is in engagement with the resistive substrate such that the angular orientation of the brush with respect to the rotor housing may be measured by applying a potential across the substrate and the brush and measuring the changes that occur in the current passing through the parts.

In accordance with the invention to permit the rotor to vibrate with respect to the housing supporting the shaft, the position sensor of the present invention includes a second housing that surrounds the rotor housing. A plurality of spring members extend between the first rotor housing and the second rotor housing for moveably retaining the first rotor housing, with the rotor therein, with respect to the second rotor housing. In a second embodiment an annular gasket is fitted between the outer circumference of the inner housing and the inner circumference of the outer housing to permit movement of the inner housing with respect to the outer housing.

BRIEF DESCRIPTION OF THE DRAWINGS

A better understanding of the present invention will be had after reading of the following detailed description taken in conjunction with the drawings, wherein:

FIG. 5 is an isometric view of an angular position sensor in accordance with the present invention;

FIG. 6 is a cross-sectional view of the angular position sensor shown in FIG. 5;

FIG. 7 is an enlarged fragmentary of an outer housing member of the angular position sensor shown in FIG. 5 showing a retaining strap in the extended position;

FIG. 8 is an enlarged fragmentary view of an outer housing member of the angular position sensor shown in FIG. 5 showing a retaining strap in the constricted position;

DETAILED DESCRIPTION OF A PREFERRED EMBODIMENT

Figure 1:
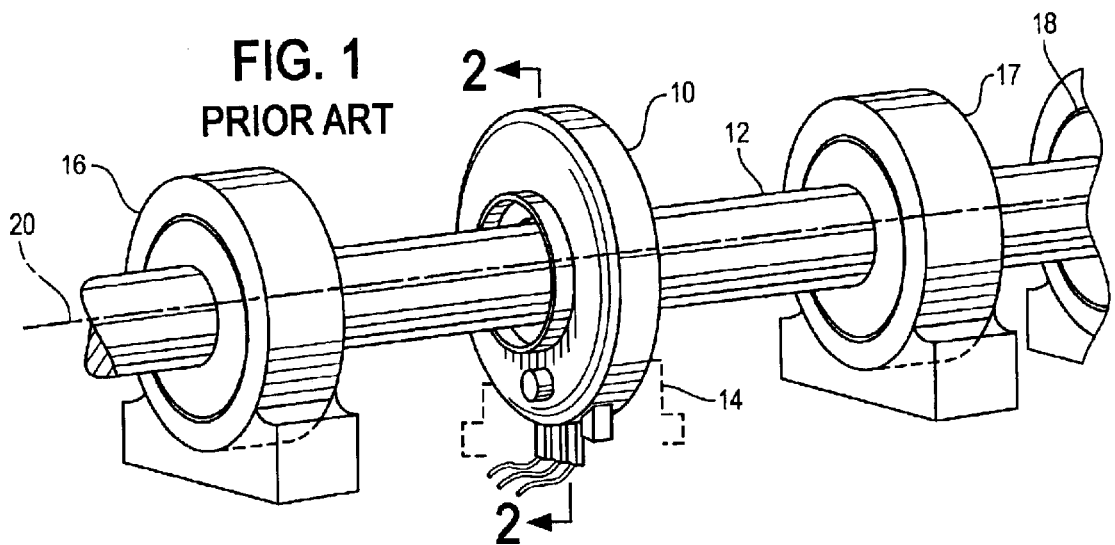
FIG. 1 is an isometric view of a rotating shaft having an angular position sensor in accordance with the prior art mounted thereon.

Referring to FIG. 1, an angular position sensor 10 in accordance with the prior art is fitted around a shaft 12 and is retained on mounting 14 by retainers, not shown, of the type well known in the art. The shaft 12 is supported by a plurality of bearings 16, 17, 18 for rotation about its longitudinal axis 20, while the housing 14 and the outer portions of the angular position sensor 10 remain stationary. Since the angular position sensor 10, as shown, is not immediately adjacent any of the bearings 16, 17, 18, and the bearings 16, 17, 18 may not be perfectly aligned with the longitudinal axis 20 of the shaft 12, the shaft 12 will undergo some degree of differential vibration within the angular position sensor 10 as the shaft 12 rotates.

Figure 2:
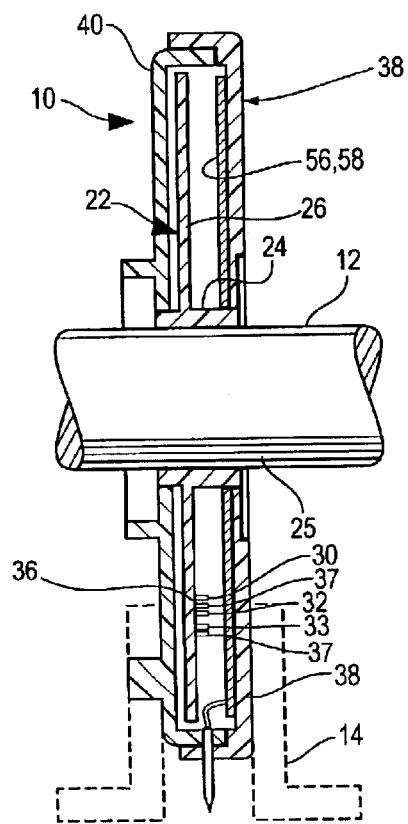
FIG. 2 is an exploded view of the angular position sensor shown in FIG. 1.
Figure 3:
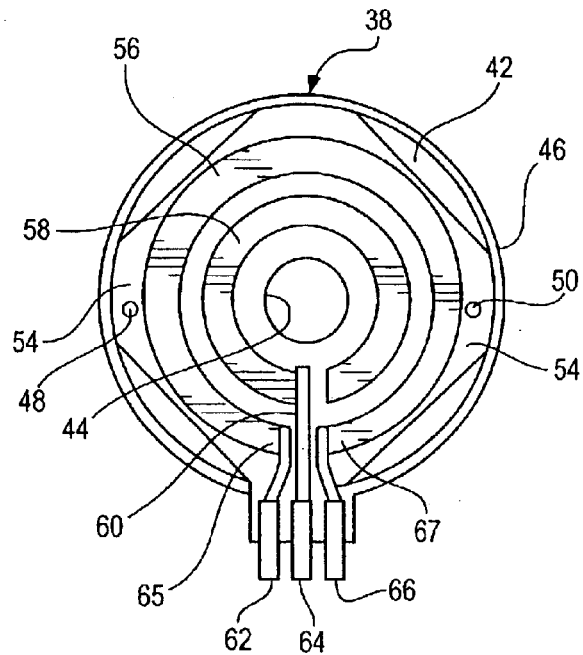
FIG. 3 is a front elevational view of the inner surface of the rotor for the angular position sensor shown in FIG. 1.

Referring to FIGS. 2 and 3, the angular position sensor 10 includes an annular rotor 22, the body of which has a tubular sleeve portion 24 defining a generally cylindrical central opening 25 sized to slideably receive the shaft 12, and surrounding the sleeve portion 24 is a radial flange 26. Projecting radially inwardly of the central opening 25 is a protrusion 28 for engaging a key slot, not shown, on the shaft 12 such that the rotor 22 will rotate with the shaft 12. Spaced radially outward of each other on the flange 26 are a plurality of electrically conductive brushes 30, 31, 32, 33, 34 made of a spring steel or the like and adapted to extend parallel to one another at different radii from the axis 20 of the shaft 12 and protrude in a direction parallel to the axis 20. The brushes 30–34 are electrically connected to one another on a common buss 36. The sleeve 24 and flange 26 are made of a non-conductive plastic and the flange 26 has a retaining slot into which the buss 36 is cemented, or retained in any other suitable means, so as to rotate with the flange 26.

Figure 4:
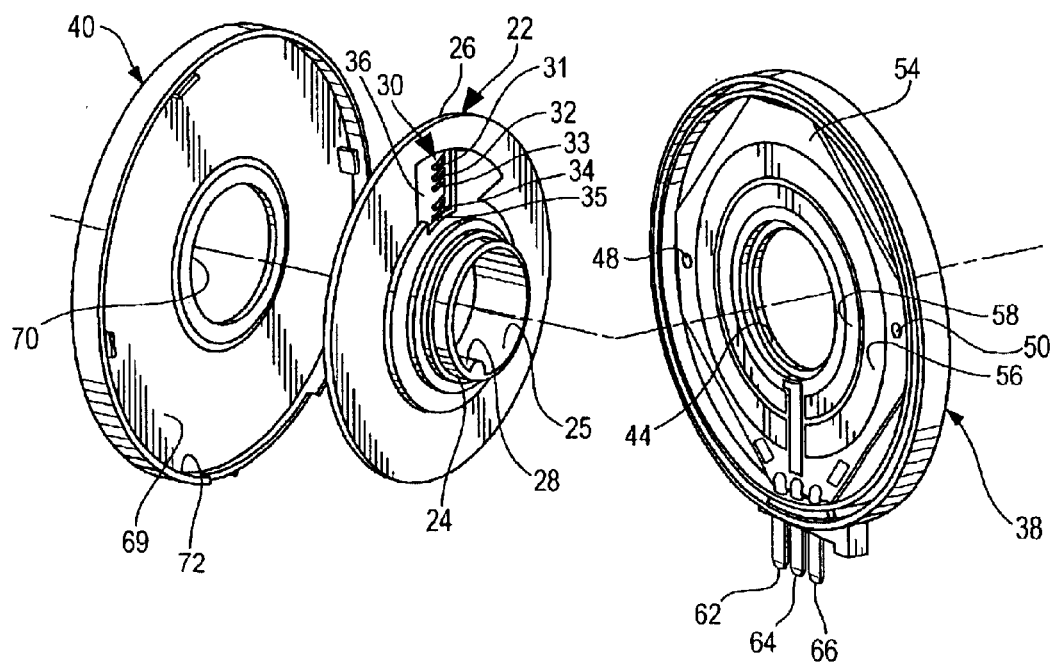
FIG. 4 is an exploded isometric view of the angular position sensor shown in FIG. 1.

Referring to FIGS. 2, 3, and 4, surrounding the rotor 22 is a clamshell housing, consisting of a first annular housing member 38 and a second complementarily shaped annular housing member 40. The first housing member 38 includes a web portion 42 having a circular central opening 44, the diameter of which is a little large than the outer diameter of the sleeve 24 of the rotor 22. At the outer circumference of the web portion 42 is a tubular axially extending flange 46. Retained by a pair of retaining pins 48, 50 to the inner surface of the web portion 42 is an annular insulated substrate 54 and printed on the substrate 54 are first and second concentric rings of resistive material 56, 58. The concentric rings 56, 58 are spaced from one another by a distance sufficient to electrically insulate the rings 56, 58 from one another.

As best shown in FIG. 3, neither of the rings 56, 58 scribe an entire circle, but are broken with the ends spaced sufficiently far apart to insulate the ends from each other and to allow a printed connector portion 60 to connect to one end of the inner broken resistive ring 58. The first housing member 38 further includes three connector pins 62, 64, 66, which extend radially outward of the web portion 42 with the central connector pin 64 electrically connected through connector 60 to one end of the inner ring 58 and the outer pins 62, 66 electrically connected at points 65, 67 to opposite ends of the outermost broken resistive ring 56 as shown.

Referring further to FIGS. 2, 3, and 4, the second annular housing member 40 also includes a web portion 69 with a central opening 70 having a diameter a little larger than the outer diameter of the sleeve portion 24 of the rotor 22, and at the outer edge of the web portion 69 a tubular radial flange 72. As best shown in FIG. 6, the tubular radial flange 72 of the second housing member 40 fits within the inner circumference of the tubular radial flange portion 46 of the first housing member 38 for enclosing the rotor 22. With the rotor 22 enclosed in the housing formed by members 38, 40, brushes 30, 31, 32 will contact the exposed surface of the first ring 56 of resistive material and brushes 33, 34 will contact the second broken ring 58 of resistive material. By connecting an electric potential across the outer pins 62, 66 and connecting an ammeter between the central connector 64 and ground the current measured by the ammeter is related to the angular orientation of the rotor 22 with respect to the housing. By digitizing the current measured and employing a microcomputer, the angular orientation of the brushes 30–34, as they rotate with the shaft 12 with respect to the housing 14 can be electronically displayed in degrees.

By allowing sufficient room within the opposing web portions 42, 68 of the housing members 38, 40 and by providing large enough central openings 44, 70 therein, the rotor 22 may endure the differential vibration that occurs midway along the length of the shaft 12. Nonetheless, as the rotor 22 spins within the inner interior of the clam shell formed by housing members 38, 40 portions of the rotor will engage portions of the housing members 38, 40 and cause particles of plastic or other material of which the parts are made to interfere with the engagement of the brushes 30–34 against the resistive material of the rings 56, 58 and thereby cause inaccurate readings from the angular position sensor 10.

Referring to FIGS. 5 through 9, an angular position sensor 80 in accordance with the present invention which overcomes the problems of the prior art includes a rotor 82 rotatably retained within a first housing formed by complementarily shaped first and second housing members 84, 86 which in turn is moveably suspended within a second housing formed by complementarily shaped third and fourth housing members 88, 90. The body of the rotor 82 includes a tubular portion 92 having a central opening 94 sized to slideably receive the shaft 12 and a radial flange portion 96 extending outward of a midsection of the tubular portion 92. The rotor 82 is adapted to be locked for rotation with the shaft by any appropriate means and is depicted as having a radially inwardly projecting ridge 98 suitable for engaging a key slot (no indicia number given) on the shaft 12. Alternately, the rotor 82 may have one or more longitudinal slots 100 in the tubular portion thereof for receiving a key, not shown, extending outward of the shaft 12. Mounted on the radial flange 96 at different radii are at least two axially projecting brushes 102, 104 electrically connected together by a buss 106. In accordance with the present invention, the outer surfaces 108, 110 of the tubular portion 92 of the rotor 82 are polished so as to serve as bearings, and extending around the circumference of one of the outer surfaces 108 is an annular bead 112.

The first housing member 84 includes a tubular sleeve portion 114, the inner surface 115 of which is polished as a bearing and has a diameter sized to rotatably receive the outer bearing surface 108 of the rotor 82. An annular groove 116 receives the annular bead 112 on the surface 108 to retain the first housing member 84 to the tubular portion 92 of the rotor 82. The first housing member 84 further includes an annular radial web portion 118. At the outer edge of the web portion 118 is a generally tubular shaped annular flange 120. Extending axially outward from the web portion 118 at locations near the sleeve 114 are a plurality of axially extending protrusions, two of which 122, 124, are visible in FIG. 9.

The second housing portion 86 includes a tubular sleeve portion 126, the inner circumference 129 of which is polished to form a bearing with the outer surface 110 of the tubular portion 92 of rotor 82. Extending radially outward of the tubular portion 126 is a web 128, and at the outer circumference of the web 128 is a generally tubular flange portion 130 adapted to engage the tubular flange portion 120 of the first housing member 84 and thereby form a clam shell around the rotor 82. The second housing member 86 also has pins or the like, not shown, the retain an annular electrically conductive annular substrate 132 on which are deposited first and second concentric broken rings 134, 136 of resistive material, with the diameters of the broken rings 134, 136 sized to be engaged by the brushes 102, 104 of the rotor 82. The second housing member 86 further has connector wires 138, 139, 140 extending outward of the radial flange portion 130, with each of the connector wires 138–140 connected to the broken rings of resistive material 134, 136 in the same fashion that the connecting pins 62, 64, 66 are electrically connected to the broken rings of resistive materials 56, 58 of the prior art angular position sensor 10.

When the first and second housing members 84, 86 are assembled to each other around the rotor 82, the bearing surfaces 108, 110 can rotate freely within the bearing surfaces 115, 129 of the housing members 84, 86, and the remaining portions of the rotor 82 will not contact the inner surfaces of the housing members 84, 86. Therefore resistance between the rotor and the surrounding housing will not cause the formation of particles of plastic and the like, which might otherwise interfere with the engagement of the brushes 102, 104 with the first and second broken rings of resistive material 134, 136. The second housing member further includes a plurality of axially directed protrusions extending from the web 128, two of which 142, 144, are visible in FIG. 9.

Figure 9:
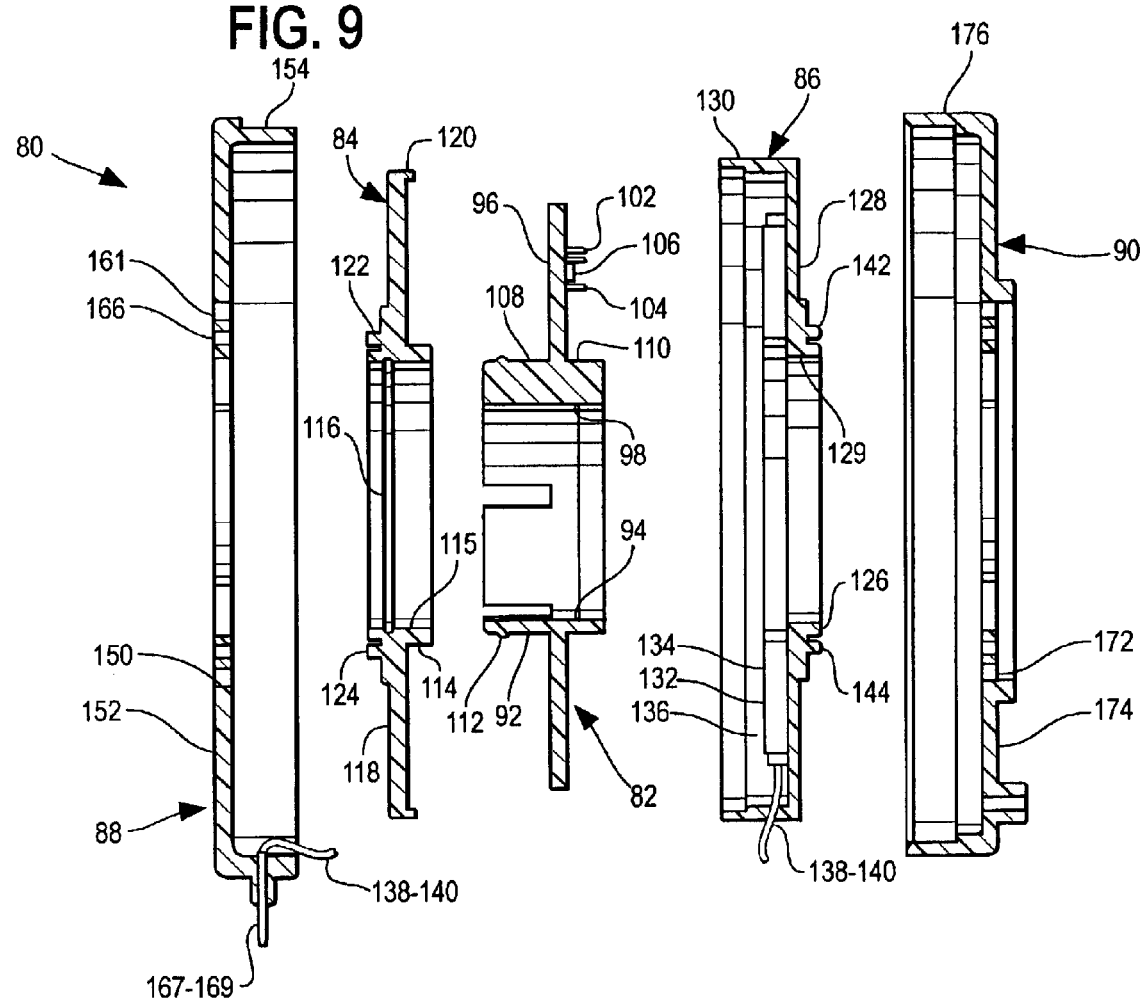
FIG. 9 is an exploded cross-sectional view of the angular position sensor shown in FIG. 5.

As shown in FIGS. 5, 6, and 7, the first housing formed by housing members 84, 86 is in turn moveably suspended in a second housing formed by third housing member 88 and fourth housing member 90. The third housing member 88 has an annularly shaped body with a circular central opening 150 and surrounding the opening 150 is a web portion 152. At the outer circumference of the web portion 152 is a generally tubular flange portion 154. Extending inwardly of the central opening 150 are a plurality of flexible plastic straps 156, 157, 158, 159 with both ends of the straps attached to the body of the third housing 88. At the center of each of the straps 156–159 is an enlarged portion 161, 162, 163, 164 with a central hole in each of the enlarged portions, one of which 166 is visible in FIGS. 6 and 7. The diameter of each of the holes 166 is sized to receive one of the protrusions 122, 124 or 142, 144 of the first and the second housing members 84, 86. As shown in FIGS. 5, 6 and 9, extending radially through the cylindrical flange 154 are contacts 167, 168, 169 with each of the contacts electrically connected to one of the wires 138, 139, 140. The contacts 167, 168, 169 therefore permit the electrical connection to the resistive elements of angular position sensor 80 into an exterior circuit.

The fourth housing member 90 also has an annularly shaped body with a circular central opening 172 and surrounding the opening 172 is a web portion 174. At the outer circumference of the web portion 174 is a generally tubular flange portion 176 adapted to slideably nest within the tubular flange portion 154 of the third housing portion 88. Extending inwardly of the central opening 172 are a plurality of flexible plastic straps, not visible in the drawings, with both ends of the straps attached to the fourth housing member 90 at positions within the central opening 172 similar to the straps 156–159 of the third housing member 88 shown in FIG. 5. The center of each of the straps has an enlarged portion therein similar to the enlarged portions 161–164 of the straps of the third housing member 88, and each enlarged portion has a hole therein similar to hole 166 in the enlarged portions of the straps of the third housing 88. The diameter of each of the holes are in turn sized to receive one of the protrusions 122, 124 or 142, 144 of the first or the second housing members 84, 86.

When the parts are in an assembled relationship, as shown in FIG. 6, the protrusions 122, 124 of the first housing member 84 are inserted into the central holes 161–164 of the third housing member 88 and the protrusions 142, 144 of the second housing member 86 are inserted into the corresponding holes (not visible) of the fourth housing member 90 and the third and fourth housing members 88, 90 are assembled together around the first housing formed by the first and second housing members 84, 86. The outer surfaces of the third and fourth housing members 88, 90 further have mounting means of the type known in the art, not shown, for retaining the outer housing stationary.

When an angular position sensor 80 in accordance with the present invention is fitted on a shaft 12 in the housing 14, the rotor 82 and the first housing consisting of the first and second housing members 84, 86 will be free to vibrate with the differential vibration of the shaft 12 within the second housing formed by third and fourth housing members 88, 90. As the shaft 12 vibrates, the rotor 82 and the surrounding first housing (housing members 84, 86) will vibrate with the rotor while the outer housing, formed by third and fourth housing members 88, 90 will remain stationary on its mounting 14. The relative movement of the inner housing (housing members 84, 86) with respect to the second housing (third and fourth housing members 88,90) is absorbed by the flexible plastic straps 156–159 of the third housing member 88 and the corresponding straps of the fourth housing member 90.

As can be seen, the rotor 82 will rotate within the inner housing (formed by housing members 84, 86) without interfering with the surfaces of the inner housing and therefore there will be no friction between the moving parts that would create particles of plastic which could interfere with the contact of the brushes 102, 104 with the broken rings of resistive material 134, 136. The output of a position sensor 80 in accordance with the present invention, therefore, will not deteriorate with time as was the case with the angular position sensor 10 of the prior art.

Figure 10:
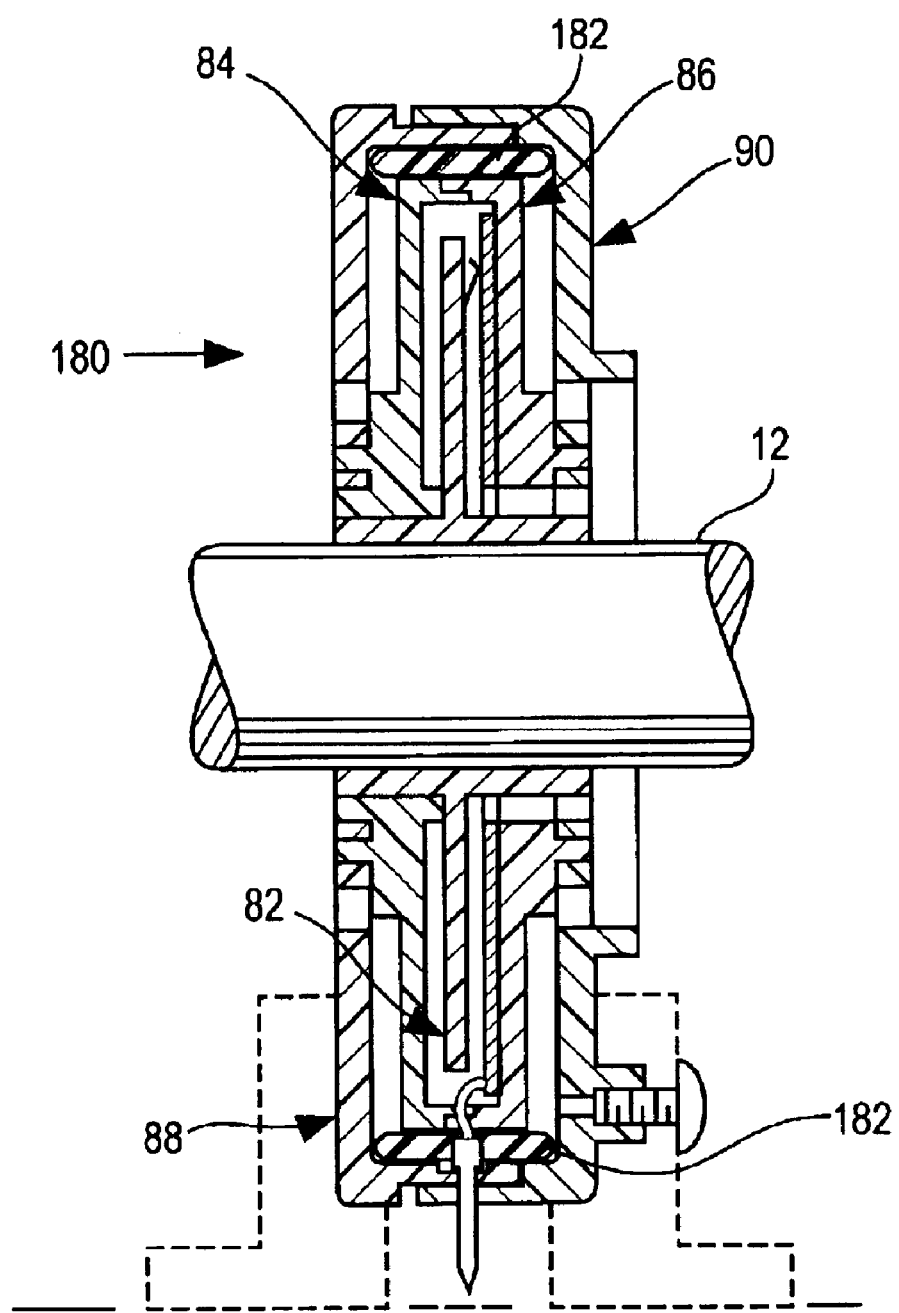
FIG. 10 is a cross sectional view of a second embodiment of an angular position sensor in accordance with the present invention.
Figure 11:
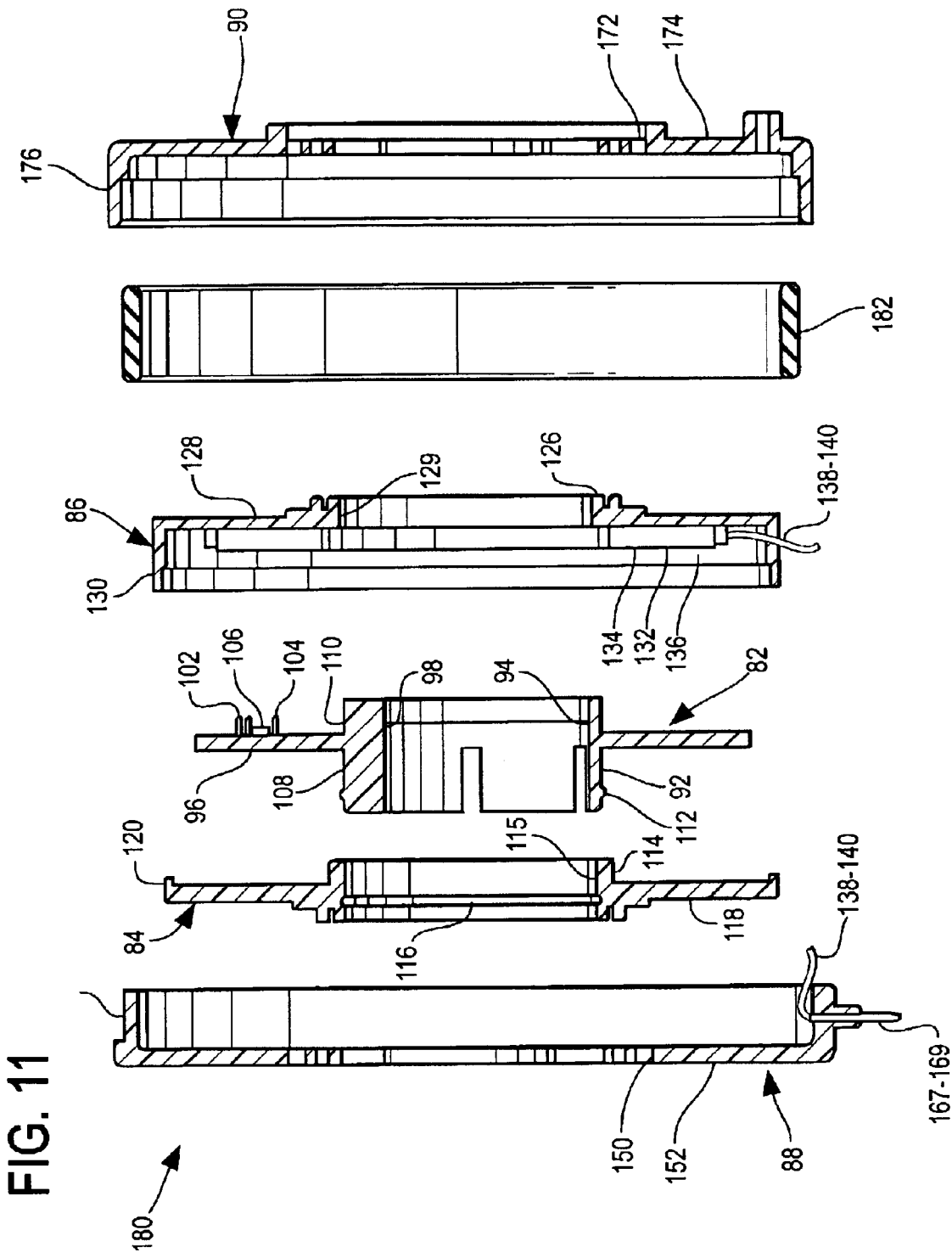
FIG. 11 is an exploded cross sectional view of the embodiment shown in FIG. 10.

Referring to FIGS. 10 and 11 in which a second embodiment of an angular position sensor 180 in accordance with the present invention is depicted. The elements of the angular position sensor 180 that are similar to or are identical to corresponding elements of the angular position sensor 10 bear the same indicia numbers to those or the angular position sensor 10 except they are primed. In this embodiment the straps 156–159 with the enlarger central portions 122, 124, 142, 144 with holes 166 therein on the outer housing members 88, 90 and the axial protrusions 122, 124, 142, 144 on the inner housing members 84, 86 are all deleted. Instead a flexible annular gasket 182 extends around the outer circumference of the inner housing 84', 86', and within the outer housing 88', 90'. The gasket 182 permits the inner housing 84', 86', to vibrate with respect to the outer housing 88', 90'. It should be appreciated that there must be sufficient friction between the gasket 182 and the inner housing 84', 86' and between the gasket 182 and the outer housing 88', 90' to prevent rotation of the inner housing with respect to the outer housing.

While the present invention is described with respect to a single embodiment, it will be appreciated that many modifications and variations may be made without departing from the true spirit and scope of the invention. It is therefore the intent of the independent claims to cover all such modifications and variations which fall within the true scope and spirit of the invention.

What is claimed is:

1. An angular position sensor for determining the angular orientation of a shaft rotatable with respect to a stationary body wherein said shaft is radially moveable with respect to said stationary body during the rotation of said shaft, said rotational position sensor comprising a rotor having a bore sized to receive said shaft, means for locking said rotor for rotation with said shaft, a first housing surrounding a portion of said rotor, a bearing between said rotor and said first housing, means on said rotor for measuring the angular orientation of said rotor with respect to said stationary body, a second housing surrounding a portion of said first housing, and a spring member between said first housing and said second housing wherein said said first housing is moveable with said shaft while said second housing remains unmoveable with said stationary body.

2. An angular position sensor in accordance with claim 1 wherein said spring member is a compressible gasket fitted between said first housing and said second housing.

3. An angular position sensor for determining the angular orientation of a shaft rotatable with respect to a stationary body, wherein said shaft is radially moveable with respect to said body during the rotation of said shaft, said rotational position sensor comprising a rotor having a bore sized to receive said shaft, means for locking said rotor for rotation with said shaft, said rotor having a first bearing member, a non-rotatable member having a second bearing member complementary to said first bearing member of said rotor, said first and second bearing members forming a bearing, means on said rotor and on said non-rotatable member for detecting the angular orientation of said rotor with respect to said stationary body, a housing surrounding at least a portion of said non-rotatable member, said non-rotatable member moveable with said shaft during rotation thereof, means for non-moveably fixing said housing to said stationary body, and a spring member between said non-rotatable member and said housing for moveably retaining said non-rotatable member within said housing.

4. An angular position sensor for determining the angular orientation of a shaft rotatable with respect to a stationary body wherein said shaft is radially moveable with respect to said body during the rotation of said shaft, said rotational position sensor comprising a rotor having a bore sized to receive said shaft, means for locking said rotor for rotation with said shaft, said rotor having male bearing surface, a non-rotatable member having a female bearing surface complementary to said male bearing surface of said rotor, said female bearing surface in engagement with said male bearing surface, an annular resistive substrate on one of said rotor and said non-rotatable member, a brush on the other of said rotor and said non-rotatable member, said brush in engagement with said annular resistive substrate, said non-rotatable member moveable with said shaft during the rotation thereof, a housing, means for retaining said housing to said stationary body wherein said housing is not moveable with respect to said body during rotation of said shaft, and a spring member between said non-rotatable member and said housing for moveably retaining said non-rotatable member to said housing.

5. An angular position sensor for determining the angular orientation of a shaft rotatable with respect to a stationary body, said rotational position sensor comprising a rotor having a bore sized to receive said shaft, means for locking said rotor for rotation with said shaft, a first housing surrounding a portion of said rotor, a bearing between said rotor and said first housing, means on said rotor and said first housing for measuring the angular orientation of said rotor with respect to said first housing, a second housing surrounding a portion of said first housing, a spring member between said first housing and said second housing for moveably retaining said first housing within said second housing, and said spring member comprising a plurality of flexible connectors joining said first housing to said second housing.

* * * * *